United States Patent Office

3,084,123
Patented Apr. 2, 1963

3,084,123
PROCESS FOR PRODUCING FERRITES
Franz Hund, Krefeld-Urdingen, Germany, assignor to Farbenfabriken Bayer Aktiengesellschaft, Leverkusen, Germany, a corporation of Germany
No Drawing. Filed Jan. 27, 1959, Ser. No. 789,255
7 Claims. (Cl. 252—62.5)

The present invention is concerned with a process for producing ferrites.

The iron spinels, which are also known as ferrites, particularly in low-voltage and high-frequency technology, are crystalline compounds of ferric oxide and suitable oxides of divalent metals, particularly nickel and zinc oxides and possibly copper, cadmium, magnesium, manganese, lead and cobalt oxides. They are produced by heating mixtures of very pure active ferric oxide or hydrated ferric oxide with oxides, hydroxides, carbonates of divalent metals or other salts of volatile acids of divalent metals, the nature and amount of which is varied according to the desired properties of the ferrite, initially for a prolonged period of time at 800° C., cooled, wet milled, dried and finally calcined in an atmosphere of pure oxygen for several hours at temperatures of approximately 1200–1400° C.

Attempts have already been made to prepare intimate mixtures of oxides by simultaneous precipitation of trivalent iron and the divalent metallic ions from mixed salt solutions by means of alkalis in order to simplify the formation of spinels, the crystal lattices of which are uniform and essentially undistorted, by subsequent heating to red heat. This method, however, was not successful since the alkali cannot be efficiently washed out of the voluminous precipitates with the result that alkaline residues are found in the end products and thus exert a disadvantageous influence on their properties.

I have now found that valuable ferrites of the foregoing type can be produced in a particularly advantageous manner by adding to a mixed aqueous solution of ferrous salts and salts of other suitable divalent metals a basic precipitating agent in an amount insufficient to cause the complete precipitation of the metallic ions. Suitable basic precipitating agents are, for example, solutions of alkali-metal hydroxides or carbonates. A preferably coarsely powdered metal alloy, which contains iron and the other metals in an amount and of a kind corresponding to the metallic ions in the starting solution or in the precipitate, is added to the mixture together with an oxidizing agent which is preferably air. However, an aromatic nitro compound, particularly nitrobenzene, can also be used. A precipitate is separated off which is an intimate mixture of hydrated ferric oxide and the divalent metal hydroxides or of finished, finely divided spinels, the crystal lattices of which are distorted. The precipitate is then washed and dried, heating it at temperatures below about 1200° C., and particularly temperatures between about 100 and 1000° C., in the presence of oxygen or, preferably, air.

By this process, it is possible to produce intimate, practically alkali-free mixtures of the different hydroxides or already-finished, finely divided spinels, which can be converted into ferrites, the crystal lattices of which are essentially undistorted, after drying even by a comparatively mild thermal treatment such as, for example, by calcining for about half an hour at temperatures of 800–1100° C. This comparatively mild thermal treatment also permits the calcining to be carried out in air instead of in an atmosphere of pure oxygen without a loss of oxygen taking place which would deleteriously affect the properties of the ferrites.

Examples of divalent metal salts which are suitable as starting materials for the process, are the sulfates, chlorides, and nitrates of divalent iron, nickel, zinc, copper, manganese, cobalt, cadmium and magnesium.

As already mentioned, the alloys to be added to the reaction mixtures should correspond approximately with regard to the nature and amount of their metal components to the composition of the metallic ion mixture of the solutions. Thus, for example, iron-nickel, iron-nickel-zinc or other iron alloys can be used. It is also possible to introduce one or more of the metallic constituents in a form other than an iron alloy component: it may be added, for example, in the form of metal in admixture with iron or an iron alloy such as, for example, a mixture of an iron-nickel alloy with zinc.

As oxidizing agent there may be used, apart from oxygen or air and aromatic nitro compounds, possibly also, for example, chlorine, chlorates, perchlorates, permanganates, chromates or dichromates.

The following examples are given for the purpose of illustrating the present invention:

*Example 1*

One liter of a ferrous chloride solution (20 percent $FeCl_2$) and 26.2 milliliters of a cobaltous salt solution (13.43 percent Co) are mixed with 300 milliliters of a 43.7 percent sodium hydroxide solution. A mixture of 4 liters of a 0.5 percent ferrous chloride solution and 3 milliliters of the above cobaltous salt solution (13.43 percent Co) are quickly added. The precipitate is oxidized in about two hours by the introduction of air at a rate of 3 cubic meters per hour and a temperature of 20° C., with stirring. Then, within the period of four days at 60° C., with stirring, 200 grams of iron-cobalt alloy filings (96.0 percent Fe, 3.6 percent CO) are added and, at the same time, air is continuously passed in at a rate of 1 cubic meter per hour. An olive green to orange colored hydrated oxide of $\alpha$- or $\gamma$-FeOOH-structure is obtained. The analysis of the product, after drying at 100° C., indicates about 83 percent $Fe_2O_3$, 2.9 percent $Co_2O_3$ and 13.6 percent loss by calcining. By mild heating (250° C.) there is obtained a strong ferro-magnetic, cobalt-containing spinel lattice of $\gamma$-$Fe_2O_3$.

*Example 2*

One hundred fifty milliliters (150) of a 21 percent ferrous sulphate solution, in which 19.5 grams nickel sulphate heptahydrate ($NiSO_4.7H_2O$) are dissolved, are mixed with 52 milliliters of a 19 percent sodium hydroxide solution and 25 grams of an iron-nickel alloy (about $\frac{2}{3}$ Fe and about $\frac{1}{3}$ Ni) and 100 milliliters of nitrobenzene are added thereto. A further 225 grams of iron-nickel alloy and 165 milliliters of nitrobenzene are added in portions corresponding to that at which the reduction proceeds. The precipitated hydrated oxide precipitate is freed of aniline in the usual manner, drained, washed and dried at 100° C.

Examination of the product dried at 100° C. by conventional techniques of X-ray crystal diffraction analysis shows a finely divided goethite structure having a distorted lattice; after heating for half an hour at 800° C. a finely divided spinel lattice is obtained and, after calcining for half an hour at 1100° C., an absolutely pure and coarsely crystalline spinel lattice characterized by clear $\alpha_1$-$\alpha_2$-separation of the last lines of its diffraction patterns is obtained.

*Analysis.*—$Fe_2O_3$=67.9 percent; NiO=29.7 percent.

*Example 3*

One hundred fifty milliliters (150) of a 21 percent ferrous sulphate solution, in which 19.5 grams of nickel sulphate heptahydrate ($NiSO_4.7H_2O$) and 20.2 grams of zinc sulphate heptahydrate ($ZnSO_4.7H_2O$) are dissolved, are mixed with 42 milliliters of a 19 percent sodium hydroxide solution, 25 grams of iron-nickel alloy filings (about ⅔ Fe and about ⅓ Ni), 8 grams of zinc filings and 100 milliliters of nitrobenzene. A further 200 grams of iron-nickel alloy filings, 66 grams of zinc filings and 165 milliliters of nitrobenzene are added at a rate corresponding to the speed of reduction; if necessary, the mixture is maintained weakly acid by the addition of sulphuric acid. After the reduction, the aniline is separated off in the usual manner, the precipitate drained, washed and dried at 100° C. The precipitated yellow-brown product shows an exceptionally finely divided and very distorted spinel lattice with small inclusions of a goethite structure. After calcining for half an hour at 800° C., a product is obtained that has a uniformly regular and undistorted spinel lattice. After calcining at 1100° C., the spinel lattice only alters insofar as the size of the particles further increases whereas the lines that were observed after calcination at 800° C. are sharper and less broad.

*Analysis.*—$Fe_2O_3=45.1$ percent; $NiO=21.3$ percent; $ZnO=30.8$ percent.

I claim:
1. A process for the production of a ferrite which comprises
   (a) mixing an aqueous solution containing ferrous ion and at least one divalent cation of a metal of the group consisting of nickel, zinc, copper, manganese, cobalt, cadmium, and magnesium with
   (b) an amount of an alkaline precipitating agent that is sufficient to precipitate a substantial proportion but not all of the cations from the said solution,
   (c) adding to the said suspension a metal composition of the group consisting of
      (i) mixtures of iron and at least one metal of the group consisting of nickel, zinc, copper, manganese, cobalt, cadmium, and magnesium, and
      (ii) alloys of iron and at least one metal of the foregoing group, and
      (iii) mixtures of the foregoing alloys with at least one metal of the foregoing group (i),
         the metal content of the said metal composition being identical in kind and essentially identical in proportion to the metals in the mixture to which it is added,
   (d) subjecting the said mixture to the action of an oxidizing agent to oxidize a substantial proportion of the ferrous ion therein to the ferric state, and precipitate the same from the mixture,
   (e) separating the resulting precipitate and washing the same, and
   (f) thereafter heating the said precipitate at a temperature between about 100 and about 1200° C. in an oxygen-containing atmosphere.
2. A process as defined in claim 1 in which the heating is conducted at a temperature between about 800° C. and about 1100° C.
3. A process as defined in claim 1 in which the initial solution is prepared from a ferrous salt of the group consisting of ferrous chloride, ferrous sulfate and ferrous nitrate.
4. A process as defined in claim 1 in which the initial solution is prepared from a salt of the group consisting of the sulfates, chlorides, and nitrates of divalent nickel, zinc, copper, manganese, cobalt, cadmium, and magnesium.
5. A process defined in claim 1 in which the alkaline precipitating agent is selected from the group consisting of alkali-metal hydroxides and alkali-metal carbonates.
6. A process defined in claim 1 in which the oxidation agent is selected from the group consisting of oxygen, air, chlorine, chlorates, perchlorates, permanganates, chromates, dichromates and organic aromatic nitro compounds.
7. A process as defined in claim 1 in which the organic aromatic nitro compound is nitrobenzene.

References Cited in the file of this patent

UNITED STATES PATENTS

| | | |
|---|---|---|
| 1,997,193 | Kato et al. | Apr. 3, 1935 |
| 2,560,971 | Martin | July 17, 1951 |
| 2,694,656 | Camras | Nov. 16, 1954 |

FOREIGN PATENTS

| | | |
|---|---|---|
| 708,460 | Great Britain | May 5, 1954 |
| 721,630 | Great Britain | Jan. 12, 1955 |
| 752,659 | Great Britain | July 11, 1956 |
| 984,544 | France | Feb. 28, 1951 |
| 1,053,343 | France | Sept. 30, 1953 |
| 891,625 | Germany | Oct. 1, 1953 |